United States Patent [19]

Turner

[11] Patent Number: 5,273,245
[45] Date of Patent: Dec. 28, 1993

[54] STAND

[76] Inventor: Austin J. Turner, 8 Short Street, Merimbula, New South Wales, Australia, 2548

[21] Appl. No.: 735,370

[22] Filed: Jul. 24, 1991

[30] Foreign Application Priority Data

Jul. 26, 1990 [AU] Australia .................. PK1393/90

[51] Int. Cl.$^5$ ............................................. F16M 13/00
[52] U.S. Cl. .................. 248/185; 248/309.1; 248/313; 248/316.2
[58] Field of Search .................. 248/309.2, 313, 316.2, 248/346, 371, 309.1, 185

[56] References Cited

U.S. PATENT DOCUMENTS

| | | | |
|---|---|---|---|
| 994,790 | 6/1911 | Richards | 248/316.3 |
| 1,603,307 | 10/1926 | Anderson | 248/185 X |
| 1,754,363 | 4/1930 | Kee | 248/185 X |
| 2,621,807 | 12/1952 | Rendich | 248/346 X |
| 2,838,071 | 6/1958 | Wood | 248/346 X |
| 2,867,248 | 1/1959 | Forney | 248/346 X |
| 2,869,209 | 1/1959 | Kautzky | 248/316.3 |
| 4,798,298 | 1/1989 | Ursetta | 248/316.3 |
| 4,915,033 | 4/1990 | Bond | 248/346 X |
| 4,977,836 | 12/1990 | Bond | 248/346 X |

Primary Examiner—David L. Talbott
Attorney, Agent, or Firm—Andrus, Sceales, Starke & Sawall

[57] ABSTRACT

A stand comprising a platform having a plurality of holes therein for receiving dowels into the holes whereby to be locatable about and to secure an article located on the platform.

4 Claims, 1 Drawing Sheet

STAND

This invention relates to a stand.

Many people have a need for a stand to hold small articles such as models during construction or repair or to enable delicate painting, embroidery or sewing.

Some stands are known to the applicant which utilise clamps but these are not considered to be easy to use.

There is thus a need to provide a simple stand which will be useful for holding articles.

The present invention provides a stand comprising a platform having a plurality of holes therein for receiving dowels into the holes whereby to be locatable about and to secure an article located on the platform.

Preferably the platform is mounted on an arm to pivot about a horizontal axis.

Preferably the arm is mounted to a tray having a peripheral upstanding wall whereby to be adapted to contain articles within the tray.

Preferably the arm is demountable from the tray.

Preferably eccentrically mounted cam members on the platform adapted to be moved to secure an article located on the platform.

Preferably the cam members are conical in shape and have an eccentric bore.

A specific and exemplary construction of a platform in accordance with this invention will now be described with the aid of the accompanying drawings in which.

Figure 1:
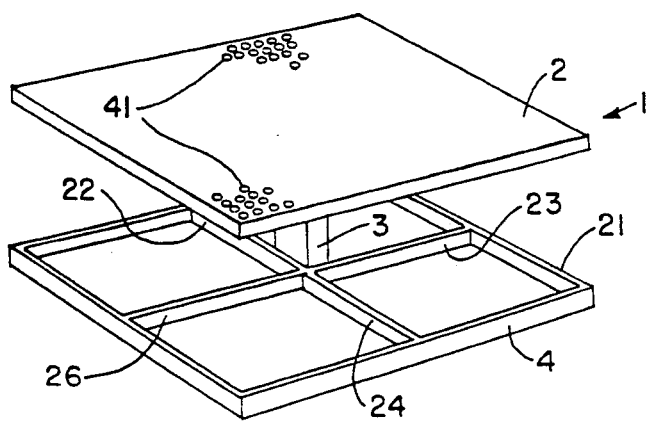
FIG. 1 is a perspective view of the stand.
Figure 5:
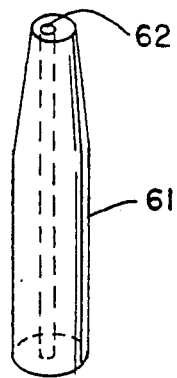
FIG. 5 is a perspective view of the cam member.
Figure 2:
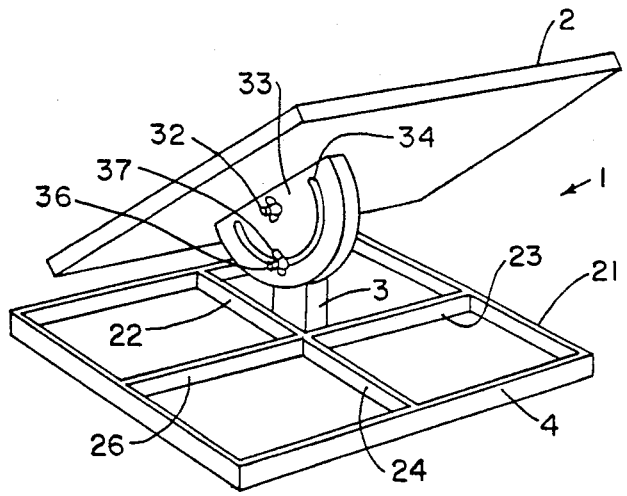
FIG. 2 is another perspective view of the stand.
Figure 3:
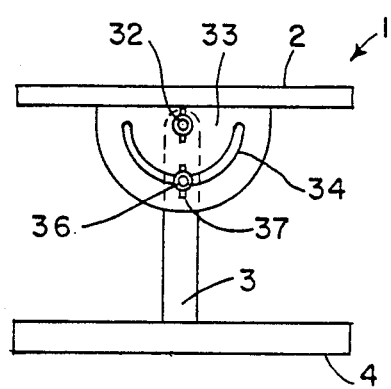
FIG. 3 is a side elevational view of the stand.

The stand 1 shown in the drawings comprises a platform 2, an arm 3 and a tray 4.

The tray 4 has a perimetric upstanding wall 21 and internal walls 22,23,24 and 26 which divide the tray into compartments. Various articles may be placed in those compartments for safe keeping or for use.

The arm 3 is secured to the tray 4 by means of screws (not shown) which pass through the bottom of the tray 4 into the arm 3.

A bolt 32 passes through the arm 3 and pivotally mounts the platform 2 to the arm 3 via a semi-circular mounting bracket 33.

The mounting bracket 33 has a generally semi-circular slot 34 and a bolt 36 passes through the arm 33 and through the slot 34. The bolt 36 is provided with a wing nut 37 and by tightening the wing nut 37 the platform 2 may be held in any desired pivoted position about the bolt 2.

The platform 2 is provided with a large number of holes 41 over its entire surface. The holes 41 are about 6 mm in diameter and are spaced apart at about 12 mm centres.

Dowels 51 are provided and may be lodged in any selected ones of the holes 41 for the purpose of locating an article on the platform 2.

Further, cam members 61 are provided. The cam members 61 are generally conic or cylindrical in shape and have an eccentric bore hole 62.

Figure 4:
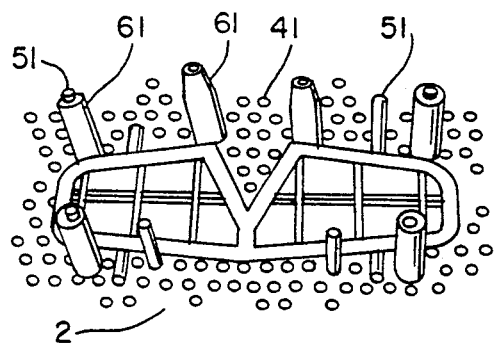
FIG. 4 is a fragmentary view of the stand showing a manner of use.

The cam members 61 may be placed over selected ones of the dowels 51 and can be rotated to effect a wedging of an article on the platform 2 such as is shown in FIG. 4.

The above described stand is preferably made principally of wood or synthetic plastics material.

The above described stand will be found to be useful to many people.

Amongst the uses to which the stand may be put are modelling, painting small articles, displaying objects, embroidery, sewing, standing books or drawing mount.

Finally, various alterations, modifications and or additions may be incorporated into the various constructions and arrangements of parts without departing from the spirit and ambit of the invention.

I claim:

1. A stand apparatus for retaining an article, said stand apparatus comprising:

a platform with respect to which the article may be positioned, said platform having a plurality of holes;

dowels insertable into said holes and extending above said platform so as to be located about the article;

at least one cam member having a frusto-conical outer surface, said cam member having an eccentric bore extending therethrough by which the cam member may be selectively and freely placed on, or removed from, a dowel and moved with respect to said dowel, said eccentric bore being displayed from the axis of the conical outer surface;

whereby the conical outer surface of said cam member may be brought increasing or decreasingly to bear on the article to position and retain the article with respect to said platform by wedging same between said dowel members and cam member.

2. A stand apparatus as claimed in claim 1, wherein the platform is mounted on a base means to pivot about a horizontal axis.

3. A stand apparatus as claimed in claim 2 wherein the base means has a tray having a peripheral upstanding wall whereby to be adapted to contain articles within the tray.

4. A stand apparatus as claimed in claim 3 wherein the base means has an arm for mounting the platform and wherein the arm is demountable from the tray.

* * * * *